US007950405B2

(12) United States Patent
Turner et al.

(10) Patent No.: US 7,950,405 B2

(45) **Date of Patent: *May 31, 2011**

(54) ENHANCED PATIENT MOBILITY APPARATUS

(76) Inventors: David B Turner, Eagleville, TN (US); Ralph Myers, Eagleville, TN (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/391,766

(22) Filed: Feb. 24, 2009

(65) Prior Publication Data

US 2010/0212708 A1 Aug. 26, 2010

(51) Int. Cl.
*A61H 3/00* (2006.01)
*B62M 1/00* (2010.01)

(52) U.S. Cl. ... 135/67; 135/66; 280/87.021; 280/87.041

(58) Field of Classification Search .................... 135/67, 135/65, 66; 280/87.021, 37.041
See application file for complete search history.

(56) References Cited

U.S. PATENT DOCUMENTS

| | | | | |
|---|---|---|---|---|
| 3,195,550 | A * | 7/1965 | Ingalls et al. | 135/67 |
| 5,277,438 | A * | 1/1994 | Chuang | 280/42 |
| 5,320,122 | A * | 6/1994 | Jacobson, II et al. | 135/66 |
| 5,380,262 | A * | 1/1995 | Austin | 482/68 |
| 5,538,268 | A * | 7/1996 | Miller | 280/87.05 |
| 6,503,176 | B2 * | 1/2003 | Kuntz | 482/66 |
| 6,595,530 | B2 * | 7/2003 | Wood | 280/42 |
| 6,607,202 | B1 * | 8/2003 | Palmer | 280/87.021 |
| 7,243,666 | B2 * | 7/2007 | Carroll | 135/67 |
| 7,484,740 | B2 * | 2/2009 | Miller | 280/87.021 |
| 7,494,139 | B2 * | 2/2009 | Turner et al. | 280/87.021 |
| 2008/0078431 | A1 * | 4/2008 | Battiston | 135/67 |
| 2009/0050187 | A1 * | 2/2009 | Lamb | 135/67 |
| 2009/0115158 | A1 * | 5/2009 | Lawrence | 280/200 |

* cited by examiner

*Primary Examiner* — David Dunn
*Assistant Examiner* — Danielle Jackson

(57) ABSTRACT

The invention is an Enhanced Patient Mobility Apparatus for use by ambulatory or recovering patients. The Enhanced Mobility Apparatus is fabricated from sturdy tubular material and has a lower U-shaped base frame member mounted on casters with an upwardly extending mid frame member and two vertical supports attached thereto and each also attached at its lower extremity to the lower U-shaped base frame member. The U-shaped base frame member, the mid frame member and the two vertical supports define a walking space for the patient with provision for the possibility of the patient also being able to move about with oxygen tanks, a patient intravenous drip apparatus and other medical devices and apparatus which must be transported by an ambulatory patient.

6 Claims, 4 Drawing Sheets

ENHANCED PATIENT MOBILITY APPARATUS

BACKGROUND OF THE INVENTION

The invention described herein is an Enhanced Patient Mobility Apparatus (EPMA) for use by ambulatory or recovering patients. Frequently it is important for hospital patients to be ambulatory as soon as possible to enable a shorter post operative recovery and hospital stay. Many times it is a problem to provide ambulatory patients with a way for them to move about. The most frequent means of providing ambulatory assistance to a patient is the use of a patient stand; however, patient stands commonly have a relatively narrow base and are easily upset if the wheels encounter an obstruction or irregularity in the surface upon which they are traveling. Because the stands are relatively unstable there is the danger of upsetting the stand and causing the patient to trip and fall. Such accidents endanger the patient and others, not to mention the potential damage to equipment and interruption of treatment frequently necessary while patients are ambulatory. Such treatments may include the intravenous administration of nourishment, vitamins, medications, blood plasma, liquids, oxygen, catheterization equipment, infusion pumps, ventilation, suction devices, and the like. Very typically patients will require at least oxygen being administered. Consequently it may be necessary to provide means for transporting not only an oxygen cylinder but other treatment equipment at the same time. Advantageously such treatment equipment is supported by a self-contained Enhanced Patient Mobility Apparatus which also provides means for the patient to rest upon the onset of fatigue. Preferably the ambulatory equipment is easily cleanable and therefore can be used by multiple patients in a given time period. Very typically such devices however are cumbersome and difficult to maneuver and provide little in the way of equipment and personal effects storage and mobility. The present invention however is a low cost, sturdy, tubular Enhanced Patient Mobility Apparatus which addresses the shortcomings of those presently available.

SUMMARY OF THE INVENTION

The present invention is an Enhanced Patient Mobility Apparatus for use by ambulatory or recovering patients in and about the home, rehab, sub-acute, and hospital facilities. It provides such person with ease of mobility, stability and the ability to transport needed treatment equipment and necessities.

One object of the present invention is to provide a low cost, sturdy, tubular framework which is easily cleanable and easily maneuverable having sufficient carrying capacity to meet an ambulatory patient's needs. In this regard it is necessary for the Enhanced Patient Mobility Apparatus to provide walking space for the patient which is approachable from the rear of the Enhanced Patient Mobility Apparatus with it being wide enough to establish a stable, secure base member. It is a function of the present invention to provide parallel bars for supporting equipment in the form of two cross bar members, at or above knee level. It is also an object of the present invention to provide a stable difficult to tip the Enhanced Patient Mobility Apparatus having six castor type wheels four of which are located forward of the patient's center of gravity to enable the patient to rest by leaning on the device and move easily forward even on difficult surfaces or terrain. It is a further object of the invention to provide support means at a level adjacent to the patient's head to accommodate intravenous equipment such as medical drips and the like. It is a further object of the invention that the user be able to use the device in association with a wheelchair and/or bed so that transference from the wheelchair to the device is safe and easy to accomplish with qualified personnel assisting. Specifically the invention is a Enhanced Patient Mobility Apparatus for use by ambulatory or recovering patients in and about home, rehab, sub-acute, and hospital facilities providing such person with ease of mobility, stability and the ability to transport needed treatment equipment and necessities comprising: a low-cost, sturdy, tubular framework having a lower U-shaped base frame member, an upwardly extending midframe member wherein the lower U-shaped base frame member includes a crossbar member interconnecting the two legs of the U-shaped base frame member at a distance from the terminal ends of the legs of the U-shaped member to provide walking space for the patient, the lower U-shaped member further having four castor type wheels, two of which are attached each to a separate distil end of the U-shaped base frame member and two of which are attached in spaced relationship from each other on the bow of the U-shaped base frame member, and two castor type wheels being attached to the crossbar member, there being a total of six castor type wheels lying in the same plane, the apparatus further includes an I.V. pole attached to the midframe member, which is preferably no more than 6.25 feet above the plane of the conductive castor type wheels. The apparatus further includes two generally parallel upstanding vertical support bars each extending from the crossbar member at a point above the plane of the castor type wheels to the midframe member. The Enhanced Patient Mobility Apparatus further comprises two generally parallel upstanding single support bars each member for facilitating the support of necessary medical devices and equipment, preferably one or more gas cylinder holders for holding oxygen and like needed gases and which must be transported by a ambulatory patient. The EMPA includes an optional carrying basket attached to the midframe member at a point between and above the four forwardmost castor type wheels, the Enhanced Patient Mobility Apparatus further comprising two rigid support bars attached to and extending from the U-shaped base frame member at a point above the point of attachment of the two forwardmost castor type wheels in spaced relationship to each other upwardly at an incline and attached to the midframe member.

DETAILED DESCRIPTION AND PREFERRED EMBODIMENT

Figure 1:
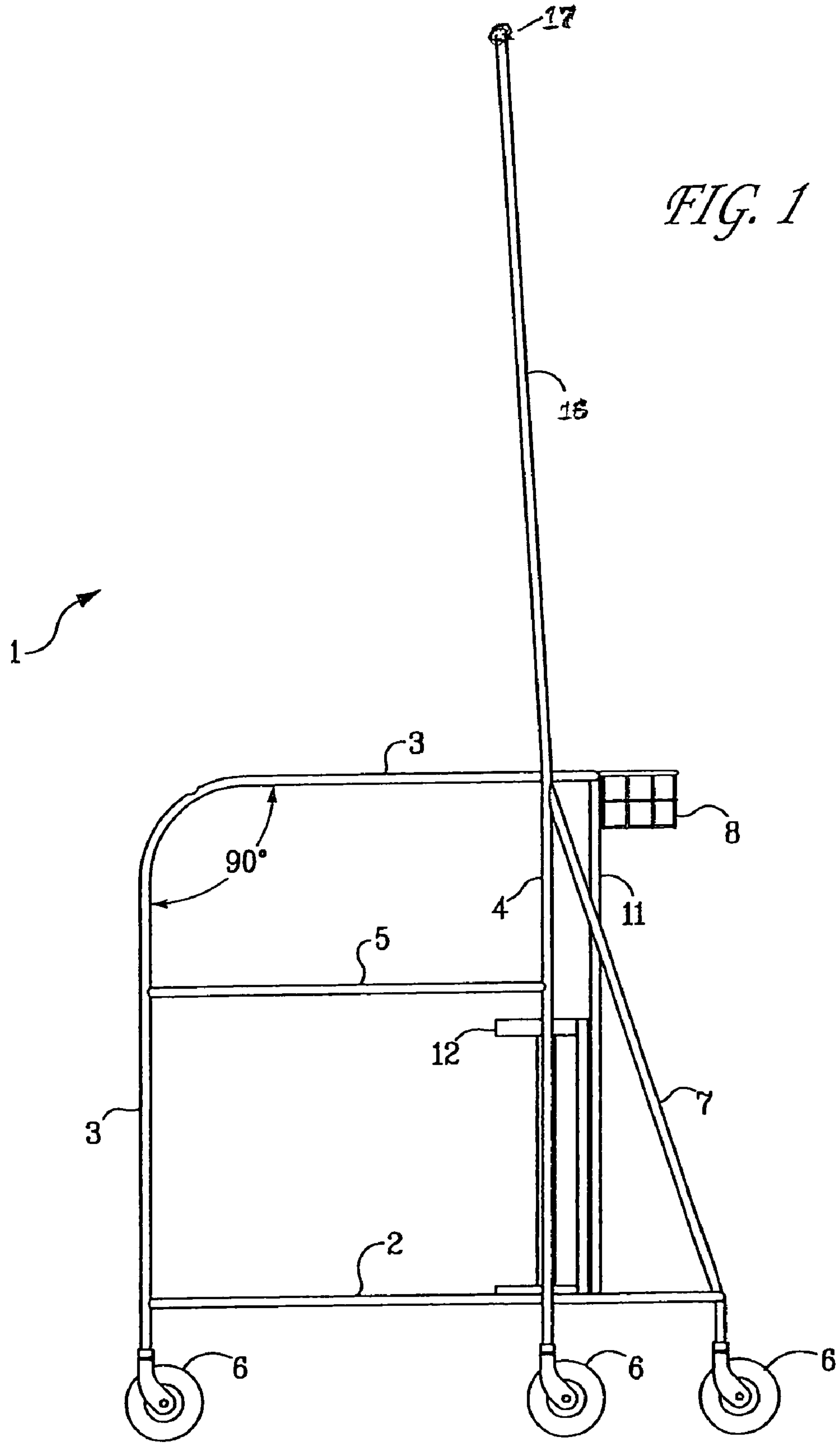
FIG. 1 is a side view of the Enhanced Patient Mobility Apparatus of the present invention.

The present invention is a Enhanced Patient Mobility Apparatus 1 for use by ambulatory or recovering patients which is of simple design yet is durable, sturdy, mobile and easy to clean. There are two major components to the Enhanced Patient Mobility Apparatus.

The first is a lower U-shaped base frame member 2. The base frame member like the entire Enhanced Patient Mobility Apparatus is preferably constructed of aluminum or light steel tubing. Preferably one-half or three-quarter inch diameter aluminum conduit is used. The various parts are fabricated together by welding or other suitable attachment means including but not limited to nuts and bolts, screws, clamping fasteners, adhesives and the like, all of which are known to those skilled in the art. The lower U-shaped base frame member has rounded corners so as not to present sharp corners which could pose a safety hazard or could easily catch on adjacent items. The rounded corners can serve as a bumper means allowing the Enhanced Patient Mobility Apparatus to easily glance off items inadvertently contacted while the Enhanced Patient Mobility Apparatus is in use. The lower U-shaped base frame member is supported by six castor type wheels 6 which lie in a plane essentially parallel to the plane defined by the lower U-shaped base frame member. These castor type wheels are preferably sized to enable the patient to travel over different surfaces/terrain in addition to a typical tile or terrazzo floor. The diameter of the castor type wheels is preferably in the range of three to six inches with a diameter of four inches being most preferred.

The second major component is an upwardly extending midframe member 3 which is a U-shaped tubular member bent at a 90 degree angle at a location above its midpoint such that it provides a patient receiving area when attached to the lower U-shaped base frame member. Vertical supports 4 are attached to the midframe member; these supports are also connected to the lower U-shaped base frame member to provide vertical support therebetween. The principal structural elements of the Enhanced Patient Mobility Apparatus are thus the lower U-shaped base frame member, and the upward extending midframe member. These elements when fastened together as shown in FIGS. 1, 2, 3 and 4 define a cage-like area which gives an invalid or recovering patient mobility, support and provides for the transportation of necessary treatment equipment. In addition, two basic structure crossbar members 5 are attached between an upstanding leg of the midframe member 3 and one of the vertical supports 4. These crossbar members are generally horizontal, parallel to the plane defined by the lower U-shaped base frame member and are positioned preferably approximately 16 to 18 inches thereabove. The positioning of these crossbar members is such that saddlebags or like paraphernalia can be supported thereby to additionally provide for the transportation of necessities and supplemental items. They may also include one or more accessory hooks 18 which can be of varying shapes and design as known to those skilled in the art. These crossbar members also provide additional stability to the basic Enhanced Patient Mobility Apparatus framework thus they serve a dual purpose.

Figure 2:
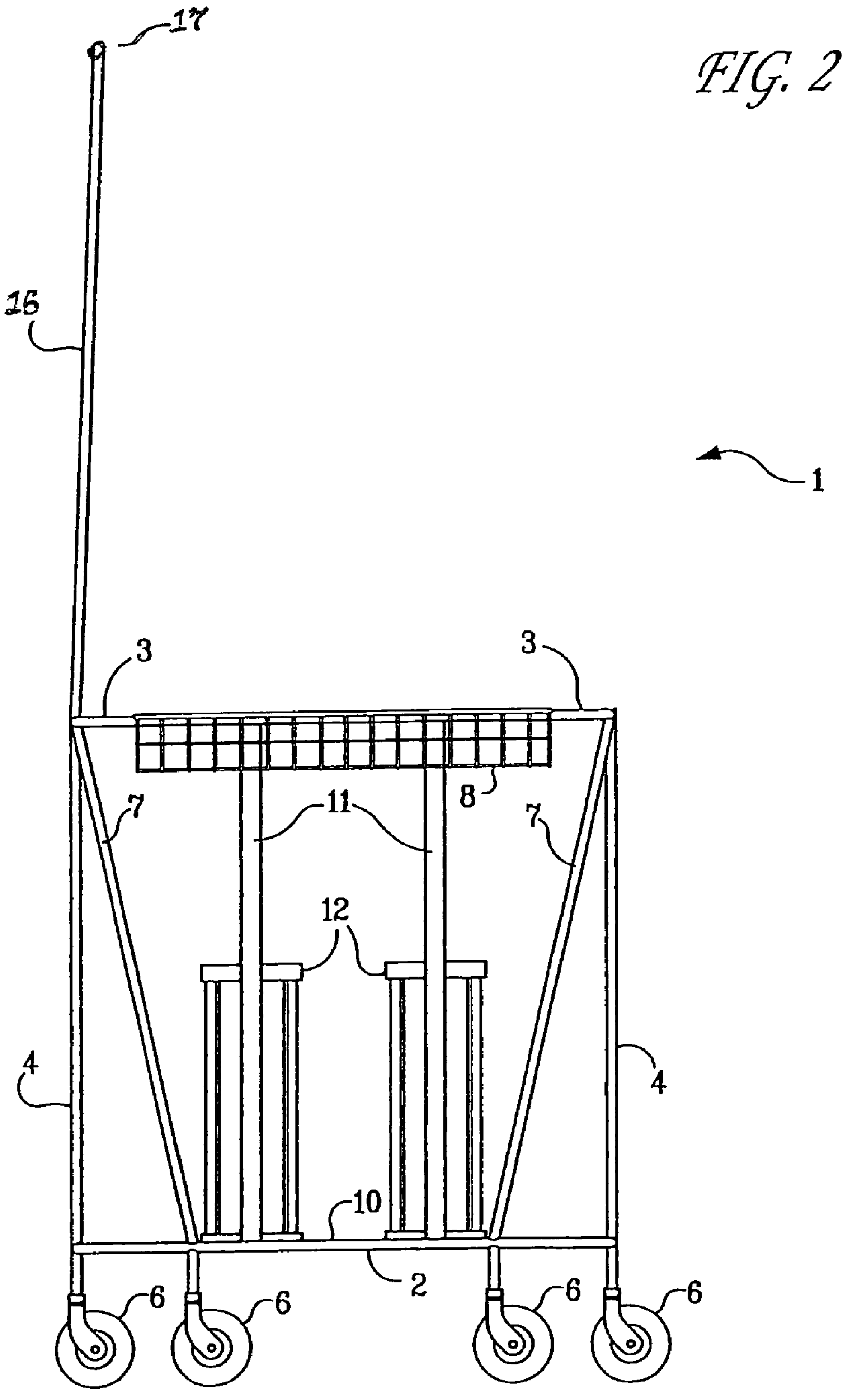
FIG. 2 is a front view of the Enhanced Patient Mobility Apparatus of the present invention.

Referring now to FIG. 2, two parallel upstanding single bar supports 11 can be seen running from the front crossover bar 10 of the lower base frame member and attached to the forwardmost portion of the upwardly extending midframe member, each being provided with a gas cylinder holder 12 for holding oxygen and like needed gases. Additionally rigid support bars 7 can be seen attached to and extending from the U-shaped base frame member at a point above the plane of attachment of the two forwardmost castor type wheels 6 in spaced relationship to each other inclining upwardly and attached to the midframe member to add dimensional stability and rigidity.

Rigid support bars 7 can be attached anywhere along the midframe member 3 and for ease of manufacturing can be inclined upwardly in parallel spaced relationship (not shown). Also shown is a carrying basket 8 as seen in FIG. 3 which is attached to the midframe member 3 to provide additional carrying capacity for patient related items.

Figure 3:
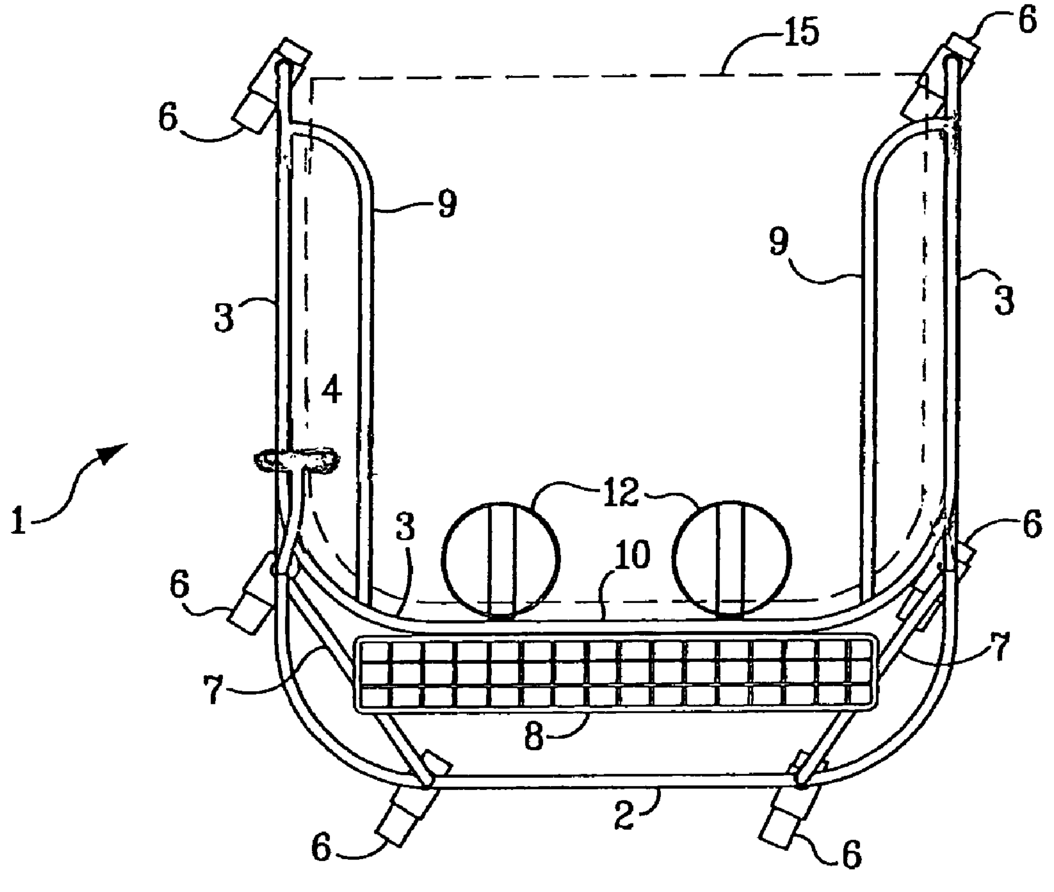
FIG. 3 is a top view of the Enhanced Patient Mobility Apparatus of the present invention.
Figure 4:
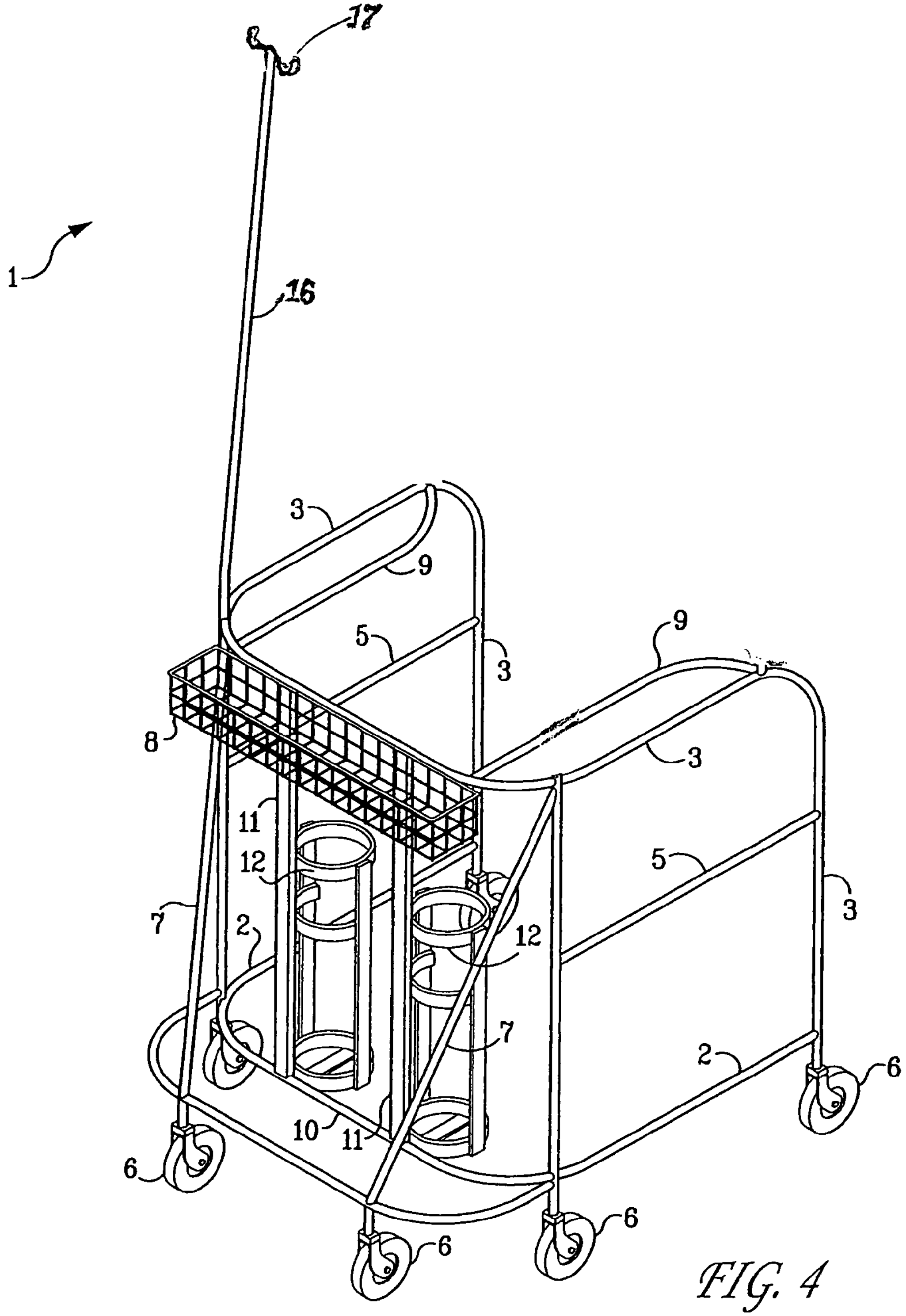
FIG. 4 is a right perspective view of the Enhanced Patient Mobility Apparatus of the present invention.

Also seen in FIG. 3 are gripping handles 9. These handles are parallel to and adjacent the midframe members' uppermost portion. They serve the function of providing the primary gripping means for the patient but they also reinforce the structure of the Enhanced Patient Mobility Apparatus. They are in the same plane as the uppermost portion of the midframe member, or slightly downwardly inclined, preferably by about one inch, toward the patient. Along with the midframe member, they provide a convenient tubular support means should the patient decide to support himself with his hands and arms. These gripping handles are preferably about twenty two inches apart thus providing sufficient room for the patient without crowding but also not being out of reach.

Lastly intravenous (I.V.) support bar or pole 16 is shown. This I.V. support bar may be used to accommodate intravenous equipment such as medical drips and the like which can be provided in association with the double hook 17. The I.V. support bar 16 is preferably detachable and is removably supported in receiving tube 19. Preferably receiving tube 19 runs generally parallel and in proximity to vertical support 4. There may be two receiving tubes, one on either side of the patient, generally parallel and adjacent, either the right or left side of the patient with the right side mount begin shown in the drawing. The phrase, generally parallel, is intended to be construed so as to permit a slight incline to I.V. support bar 16 so that as herein after explained the I.V. support bar may actually taper slightly inwardly. Stabilizing bar 20 extends between the vertical supports 4 to give additional dimensional stability to the Enhanced Patient Mobility Apparatus. For convenience receiving tube 19 rests upon the attachment points of stabilizing bar 20 and crossbar member 5.

The overall dimensions of the walker system are important since equipment in many hospitals has roughly the same dimensions.

There are several objectives in sizing the Enhanced Patient Mobility Apparatus which dictate in some measure its preferred dimensions. It is important to provide adequate walking space for the ambulatory patient within the patient space 15 as shown in dashed lines in FIG. 3. A satisfactory distance between the legs of the lower U-shaped base frame member is about 28 inches. This distance is adequate for the patient to stand and walk as well as turn from side to side to access things from tables, shelves and the like. Notice however that the preferred distance between gripping handles 9 is about 22 inches. This means that the patient space 15 actually narrows at the patient's waist section as the body narrows from hips to waist. The narrowing patient space means that the patient has a very ready means of support and creates a feeling of comfort and stability by the equipment. As discussed earlier, gripping handles 9 actually form a shelf-like plane in association with the midframe members uppermost proportion to provide immediate waist high support when needed.

The overall dimension of the Enhanced Patient Mobility Apparatus from side to side is 28 inches. This enables the patient to pass through 30 inch doors which are generally the smallest found in living units and healthcare facilities. It should be noted that it is possible for the castor type wheels to pass through a 30 inch opening. The front-most castor type wheels 6 however are positioned at a distance of about 16 inches and have rigid support bars 7 extending thereabove. This arrangement provides the maximum support for the patient since the two forwardmost castor type wheels do not track with the four following wheels. Forward tipping of the Enhanced Patient Mobility Apparatus is thus almost completely eliminated while ease of navigation is enhanced. It should be noted that upstanding single bar supports 11, having gas cylinder holders 12, are located within the dimension between the forwardmost castor type wheels. Preferably the upstanding single bar supports are spaced about a 10½ inches apart.

It should be noted that I.V. support bar 16 may actually taper slightly inwardly so that when tubular drips and other paraphernalia are hung from double hook 17 all of those items still can pass through the 28 inch space defined by separation between the castor type wheels on the lower U-shaped base frame member. The double hook 17 has been found to be most useful if the distance between the ends of the hook legs is a maximum of about 3¼ inches.

Also it should be noted that the forward distance between the two rear most castor type wheels and the next two most forward wheels is about 21½ inches. This distance coincides with the natural stride of a patient and essentially defines the length of patient space 15. The lead wheels which are attached in spaced relationship from each other on the bow of the U-shaped base frame member are about 30½ inches forward of the rear most castor type wheels so that the size of the U-shaped base frame member is about 30½ inches by about 28 inches. The gripping handles are about 34½ inches above the plane defined by the castor type wheels with the crossbar members being about 27½ inches above the plane. The height of about 27½ inches has been found to be an acceptable height to give rigid support to the Enhanced Patient Mobility Apparatus and yet provide a hanging means which can accommodate items draped there over needed by the ambulatory patient.

The U-shaped base frame member itself is about 7 inches above the plane defined by the terrain contact points of the six castor type wheels thus giving adequate space for foot movement of the ambulatory patient. Also the oxygen bottle holders are preferably about 16 inches in height and extend from the U-shaped base frame member to the crossbar members. This leaves a clearance of about 11½ inches from the top of the oxygen bottle holder to the plane defined by the uppermost portion of the upward extending midframe member and the gripping handles. The uppermost level of the carrying basket is also in the same plane.

The uppermost extension of the I.V. support bar is about 39 inches thus giving the Enhanced Patient Mobility Apparatus a total height of approximately 6¼ feet.

It is clear from the above discussion that the Enhanced Patient Mobility Apparatus of the present invention has been carefully designed to optimize the needs of an ambulatory patient while at the same time taking into consideration real live requirements of such a Enhanced Patient Mobility Apparatus. Having thus described the invention what is claimed is:

The invention claimed is:

1. An enhanced patient mobility apparatus for use by ambulatory or recovering patients in and about home, rehab, sub-acute and hospital facilities providing such patients with ease of mobility, stability and the ability to transport needed treatment equipment and necessities comprising: a low-cost, sturdy tubular framework having a lower U-shaped base frame member, an upwardly extending mid-frame member which is a U-shaped tubular member bent at a 90 degree angle at a location above its midpoint such that it provides a patient receiving area when attached to the lower U-shaped base frame member, the lower U-shaped base frame member comprising a first and second leg, each leg having two ends and a bow interconnecting one end of each leg, the other end of each leg being a distal end thereof, wherein the lower U-shaped base frame member also includes a crossbar member interconnecting the two legs of said lower U-shaped base frame member at a distance from the distal end of the legs of the U-shaped member to provide walking space for the patient, the lower U-shaped base frame member further having a first pair of castor wheels each attached adjacent to the distal end of each of the legs of the lower U-shaped base frame member, a second pair of castor wheels attached in a spaced relationship from each other on the bow of the of the lower U-shaped base frame member, and a third pair of castor wheels attached in a spaced relationship from each other in proximity to the crossbar member, all of said pairs of castor wheels lying in the same plane, the apparatus also includes two generally parallel upstanding vertical support bars each extending from the crossbar member at a point above the plane of the castor wheels to the mid-frame member, the apparatus further comprising two rigid support bars in a spaced relationship to each other attached to the lower U-shaped base frame member at a point above the point of attachment of the second pair of castor wheels and extending upwardly at an incline and attached to the mid-frame member.

2. The enhanced patient mobility apparatus of claim 1 wherein a removable I.V. pole extends from a receiving tube attached to the mid-frame member in proximity to one of the two generally parallel upstanding vertical support bars, and wherein the removable I.V. pole extends upwardly to a point approximately six feet above the plane of the castor wheels.

3. The enhanced patient mobility apparatus of claim 2 wherein the I.V. pole includes a double hook mounted to its upper end to facilitate the hanging and support of tubes and other patient enabling items/devices.

4. The enhanced patient mobility apparatus of claim 1 including a carrying basket attached to the mid-frame member at a point between and above the second and third pairs of castor wheels.

5. The enhanced patient mobility apparatus of claim 1 further comprising two parallel upstanding single bar supports running from the crossbar member of the lower U-shaped base frame member and attached to the mid-frame member and being provided with a gas cylinder holder for holding oxygen and other gases.

6. The enhanced patient mobility apparatus of claim 1 wherein two gripping handles are each attached on separate sides of the mid-frame member.

* * * * *